US009363411B2

(12) United States Patent
Murao et al.

(10) Patent No.: US 9,363,411 B2
(45) Date of Patent: Jun. 7, 2016

(54) DATA CERTIFICATION SYSTEM, SERVER DEVICE, CLIENT DEVICE, PUBLISHING SERVER, AND DATA CERTIFICATION METHOD

(75) Inventors: Shinichi Murao, Chiba (JP); Masakazu Uehata, Chiba (JP); Hitoshi Yoshida, Chiba (JP); Toshio Takahashi, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 14/240,521

(22) PCT Filed: Apr. 27, 2012

(86) PCT No.: PCT/JP2012/061365
§ 371 (c)(1),
(2), (4) Date: May 30, 2014

(87) PCT Pub. No.: WO2013/031292
PCT Pub. Date: Mar. 7, 2013

(65) Prior Publication Data
US 2014/0285854 A1    Sep. 25, 2014

(30) Foreign Application Priority Data
Aug. 29, 2011   (JP) .................................. 2011-185825

(51) Int. Cl.
  H04L 9/32        (2006.01)
  H04N 1/32        (2006.01)
  G06T 1/00        (2006.01)

(52) U.S. Cl.
  CPC .......... *H04N 1/32336* (2013.01); *G06T 1/0021* (2013.01); *H04L 9/321* (2013.01); *H04L 9/3239* (2013.01); *H04L 9/3297* (2013.01); *H04N 1/32352* (2013.01); *G06T 2201/0062* (2013.01); *G06T 2201/0064* (2013.01); *G06T 2201/0065* (2013.01)

(58) Field of Classification Search
  None
  See application file for complete search history.

(56) References Cited

U.S. PATENT DOCUMENTS

| 5,136,646 A |     | 8/1992  | Haber et al. ..................... 380/49 |
| 5,136,647 A |     | 8/1992  | Haber et al. ..................... 380/49 |
| 7,984,302 B2 | *  | 7/2011  | Fukasawa ....................... 713/177 |
| 8,028,167 B2 | *  | 9/2011  | Andersson et al. ........... 713/175 |
| 8,037,310 B2 | *  | 10/2011 | Wolff ............................ 713/176 |
| 8,810,832 B2 | *  | 8/2014  | Fukada ................. G06F 3/1206 358/1.13 |
| 2002/0118381 A1 | * | 8/2002 | Shirai et al. ..................... 358/1.9 |

OTHER PUBLICATIONS

Patent Abstracts of Japan, Publication No. 2006-277011, Publication Date Oct. 12, 2006.
Patent Abstracts of Japan, Publication No. 2003-318885, Publication Date Nov. 7, 2003.
Patent Abstracts of Japan, Publication No. 2006-157914, Publication Date Jun. 15, 2006.

* cited by examiner

*Primary Examiner* — Paul F Payer
(74) *Attorney, Agent, or Firm* — Adams & Wilks

(57) ABSTRACT

A data certification system includes a proof information generation unit that generates certification information for certifying non-falsification of raw data, and generates proof information including the certification information and time information representing the time of the generation of the certification information. A server transmission unit transmits the proof information which is received by a client reception unit. A time information acquisition unit acquires the time information representing the time of the generation of the certification information from the proof information. A report generation unit generates report data in which the time information and publishing destination information representing a publishing destination are included in the raw data. A transfer unit transfers the raw data, the proof information, and the report data to a publishing server which releases the report data. An output unit outputs the report data.

9 Claims, 6 Drawing Sheets

FIG.2

201 — REFERENCE NUMBER 12345678
202 — DATE YY ZZ, XXXX

203

REPORT ON RESULT OF RADIOACTIVITY MEASUREMENT

204 — XX CORPORATION

REPORT ON RESULT OF REQUESTED TEST IS AS FOLLOWS.

1. CLIENT            MR(S). YY
2. TEST OBJECT       VEGETABLES (TOMATO) ABOUT 500 g
3. SAMPLING REGION   ZZ CITY
4. COLLECTION DATE   YY ZZ, XXXX
5. TEST DATE         YY ZZ, XXXX
6. OVERVIEW OF TEST RESULT

⎫ 205

FOR CROPS SUBJECTED TO TEST, CONTENT OF RADIOACTIVE MATERIAL IS SMALLER THAN REFERENCE VALUE. DETAILS ARE AS STATED IN ATTACHED SHEETS.

206

.....NOTE.....

FIG.4

201 — REFERENCE NUMBER 12345678
202 — DATE YY ZZ, XXXX

203 — REPORT ON RESULT OF RADIOACTIVITY MEASUREMENT

204 — XX CORPORATION

REPORT ON RESULT OF REQUESTED TEST IS AS FOLLOWS.

1. CLIENT         MR(S). YY
2. TEST OBJECT    VEGETABLES (TOMATO) ABOUT 500 g
3. SAMPLING REGION  ZZ CITY
4. COLLECTION DATE  YY ZZ, XXXX
5. TEST DATE        YY ZZ, XXXX
6. OVERVIEW OF TEST RESULT

FOR CROPS SUBJECTED TO TEST, CONTENT OF RADIOACTIVE MATERIAL IS SMALLER THAN REFERENCE VALUE.
  DETAILS ARE AS STATED IN ATTACHED SHEETS.

205

208

206 NOTE ..................

TIME STAMP TIME (JAPAN)
XXXX/YY/ZZ AA:BB:CC — 207
※ORIGINALITY OF ORIGINAL DOCUMENT IS SECURED BY LONG-TERM SIGNATURE (JIS X5093). DOWNLOAD OF ORIGINAL DOCUMENT CAN BE PERFORMED USING ABOVE TWO-DIMENSIONAL CODE.

THIS REPORT (ELECTRONIC DATA) IS GIVEN LONG-TERM SIGNATURE (ELECTRONIC SIGNATURE + TIME STAMP) WHICH SATISFIES REQUIREMENTS OF ELECTRONIC DOCUMENTS ACT.

209

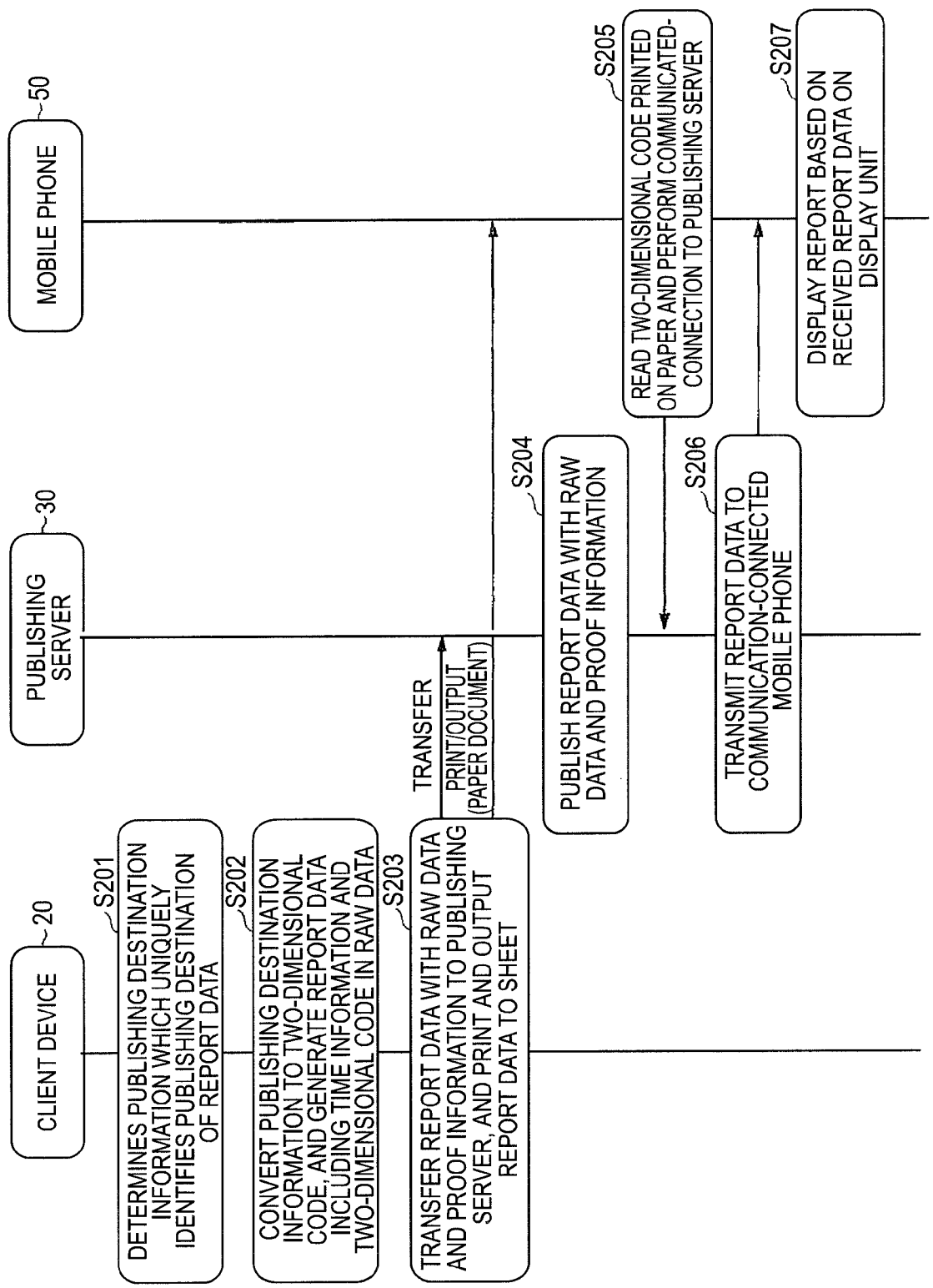

DATA CERTIFICATION SYSTEM, SERVER DEVICE, CLIENT DEVICE, PUBLISHING SERVER, AND DATA CERTIFICATION METHOD

BACKGROUND OF THE INVENTION

1. Technical Field

The present invention relates to a data certification system, a server device, a client device, a publishing server, and a data certification method.

2. Background Art

In the related art, a printing system and a copying system with a time stamp which include a falsification prevention function capable of accurately verifying the authenticity of printed matters and the authenticity of copied documents has been known (for example, see PTL 1).

CITATION LIST

Patent Literature

[PTL 1] JP-A-2003-323512

However, in the printing system and the copying system with a time stamp including a falsification prevention function described in PTL 1, there is a problem in that it is not possible to perform verification if a device which issues proof information, such as a time stamp, as information for certifying non-falsification is not used when verifying authenticity of printed matters and authenticity of copied documents.

SUMMARY OF THE INVENTION

The invention has been accomplished in consideration of the above-described situation, and an object of the invention is to provide a data certification system, a server device, a client device, a publishing server, and a data certification method capable of performing verification without using a device which issues proof information as information for certifying non-falsification when verifying non-falsification of output data.

A data certification system according to an aspect of the invention includes a server device including a server reception unit which receives raw data subject to certification of non-falsification transmitted from a client device, a proof information generation unit which generates certification information for certifying non-falsification of the raw data on the basis of the raw data received by the server reception unit, and generates proof information including the certification information and time information representing the time of the generation of the certification information, and a server transmission unit which transmits the proof information to the client device; and a client device including a client transmission unit which transmits the raw data to the server device, a client reception unit which receives the proof information transmitted from the server device, a time information acquisition unit which acquires the time information representing the time of the generation of the certification information included in the proof information from the proof information received by the client reception unit, a report generation unit which generates report data including the time information and publishing destination information representing a publishing destination in the raw data, a transfer unit which transfers the raw data, the proof information, and the report data to a publishing server, which releases the raw data, the proof information, and the report data to the publishing destination uniquely identified by the publishing destination information, and an output unit which outputs the report data generated by the report generation unit.

The data certification system may further include a publishing server which releases the raw data, the proof information, and the report data transferred from the transfer unit to the publishing destination uniquely identified by the publishing destination information, transmits the report data to a device when the device which cannot verify non-falsification of the report data using the raw data and the proof information is communication-connected to the publishing destination, and transmits the report data, the raw data, and the proof information to a device when the device which can verify non-falsification of the report data using the raw data and the proof information is communication-connected to the publishing destination.

In the data certification system, the transfer unit may set an expiration date of the proof information, and the publishing server may transmit the report data to the device only when the device which cannot verify non-falsification of the report data using the raw data and the proof information is communication-connected to the publishing destination within the expiration date of the proof information, and may transmit the report data, the raw data, and the proof information to the device only when the device which can verify non-falsification of the report data using the raw data and the proof information is communication-connected to the publishing destination within the expiration date of the proof information.

In the data certification system, the report generation unit may convert the publishing destination information to a two-dimensional code and may include the two-dimensional code in the report data.

In the data certification system, the output unit may print and output the report data on paper.

In the data certification system, the output unit may output the report data in a data format to be able to be displayed on a display device.

In the data certification system, the client device may further include a publishing destination determination unit which calculates a hash value based on the raw data and determines the publishing destination on the basis of the calculated hash value.

In the data certification system, the server device may further include a publishing destination determination unit which calculates a hash value based on the raw data and determines the publishing destination on the basis of the calculated hash value, and the server transmission unit may transmit the proof information and the publishing destination information representing the publishing destination to the client device.

A server device according to another aspect of the invention includes a server reception unit which receives raw data subject to certification of non-falsification transmitted from a client device, a proof information generation unit which generates certification information for certifying non-falsification of the raw data on the basis of the raw data received by the server reception unit, and generates proof information including the certification information and time information representing the time of the generation of the certification information, and a server transmission unit which transmits the proof information to the client device.

A client device according to further another aspect of the invention includes a client transmission unit which transmits raw data subject to certification of non-falsification to a server device, a client reception unit which receives proof information including certification information for certifying non-falsification of the raw data and time information representing the time of the generation of the certification information transmitted from the server device, a time information acquisition unit which acquires the time information representing the time of the generation of the certification information included in the proof information from the proof information received by the client reception unit, a report generation unit which generates report data including the time information and publishing destination information representing a publishing destination in the raw data, a transfer unit which transfers the raw data, the proof information, and the report data to a publishing server, which releases the raw data, the proof information, and the report data to the publishing destination uniquely identified by the publishing destination information, and an output unit which outputs the report data generated by the report generation unit.

A client device according to still another aspect of the invention includes a proof information generation unit which generates proof information including certification information for certifying non-falsification of raw data subject to certification of non-falsification and time information representing the time of the generation of the certification information, a time information acquisition unit which acquires the time information representing the time of the generation of the certification information included in the proof information from the proof information generated by the proof information generation unit, a report generation unit which generates report data including the time information and publishing destination information representing a publishing destination in the raw data, a transfer unit which transfers the raw data, the proof information, and the report data to a publishing server, which releases the raw data, the proof information, and the report data to the publishing destination uniquely identified by the publishing destination information, and an output unit which outputs the report data generated by the report generation unit.

According to yet another aspect of the invention, there is provided a publishing server which releases raw data subject to certification of non-falsification transferred from a client device, proof information including certification information for certifying non-falsification of the raw data and the time information representing the time of the generation of the certification information, and report data, in which the time information and publishing destination information representing a publishing destination are included in the raw data, to the publishing destination uniquely identified by the publishing destination information, transmits the report data to a device when the device which cannot verify non-falsification of the report data using the raw data, the raw data and the proof information is communication-connected to the publishing destination, and transmits the report data, and the proof information to a device when the device which can verify non-falsification of the report data using the raw data and the proof information is communication-connected to the publishing destination.

A data certification method according to yet another aspect of the invention includes a server reception step in which a server reception unit of a server device receives raw data subject to certification of non-falsification transmitted from a client device, a proof information generation step in which a proof information generation unit of the server device generates certification information for certifying non-falsification of the raw data on the basis of the raw data received by the server reception unit in the server reception step and generates proof information including the certification information and time information representing the time of the generation of the certification information, a server transmission step in which a server transmission unit of the server device transmits the proof information to the client device, a client transmission step in which a client transmission unit of the client device transmits the raw data to the server device, a client reception step in which a client reception unit of the client device receives the proof information transmitted from the server device, a time information acquisition step in which a time information acquisition unit of the client device acquires the time information representing the time of the generation of the certification information included in the proof information from the proof information received by the client reception unit in the client reception step, a report generation step in which a report generation unit of the client device generates report data, in which the time information and publishing destination information representing a publishing destination are included in the raw data, a transfer step in which a transfer unit of the client device transfers the raw data, the proof information, and the report data to a publishing server, which releases the raw data, the proof information, and the report data to the publishing destination uniquely identified by the publishing destination information, and an output step in which an output unit of the client device outputs the report data generated by the report generation unit in the report generation step.

Advantageous Effects of Invention

According to the invention, the client transmission unit of the client device transmits raw data subject to certification of non-falsification to the server device. The server reception unit of the server device receives the raw data transmitted from the client device. The proof information generation unit of the server device generates certification information for certifying non-falsification of the raw data on the basis of the raw data received by the server reception unit, and generates proof information including the certification information and time information representing the time of the generation of the certification information. The server transmission unit of the server device transmits the proof information to the client device. The client reception unit of the client device receives the proof information transmitted from the server device. The time information acquisition unit of the client device acquires the time information representing the time of the generation of the certification information included in the proof information from the proof information received by the client reception unit. The report generation unit of the client device generates report data, in which the time information and publishing destination information representing a publishing destination are included in the raw data. The transfer unit of the client device transfers the raw data, the proof information, and the report data to the publishing server, which releases the raw data, the proof information, and the report data to the publishing destination uniquely identified by the publishing destination information. The output unit of the client device outputs the report data generated by the report generation unit.

With this configuration, it is possible to acquire report data of non-falsification from the publishing server without using a device which generates proof information as information for certifying non-falsification. Accordingly, it is possible to verify non-falsification of data from the output unit using the report data of non-falsification acquired from the publishing server. Therefore, it is possible to perform verification without using a device which issues proof information as information for certifying non-falsification when verifying non-falsification of data output from the output unit.

BRIEF DESCRIPTION OF DRAWINGS

FIG. 2 is a schematic view showing an example of a report on a result of radioactivity measurement included in raw data according to the present embodiment.

FIG. 4 is a schematic view showing an example of a report on a result of radioactivity measurement included in report data according to the present embodiment.

FIG. 6 is a sequence diagram showing an operational procedure when a report is created using the data certification system according to the present embodiment and a verifier verifies non-falsification of report data using a mobile phone.

DETAILED DESCRIPTION OF THE EMBODIMENTS

Figure 1:
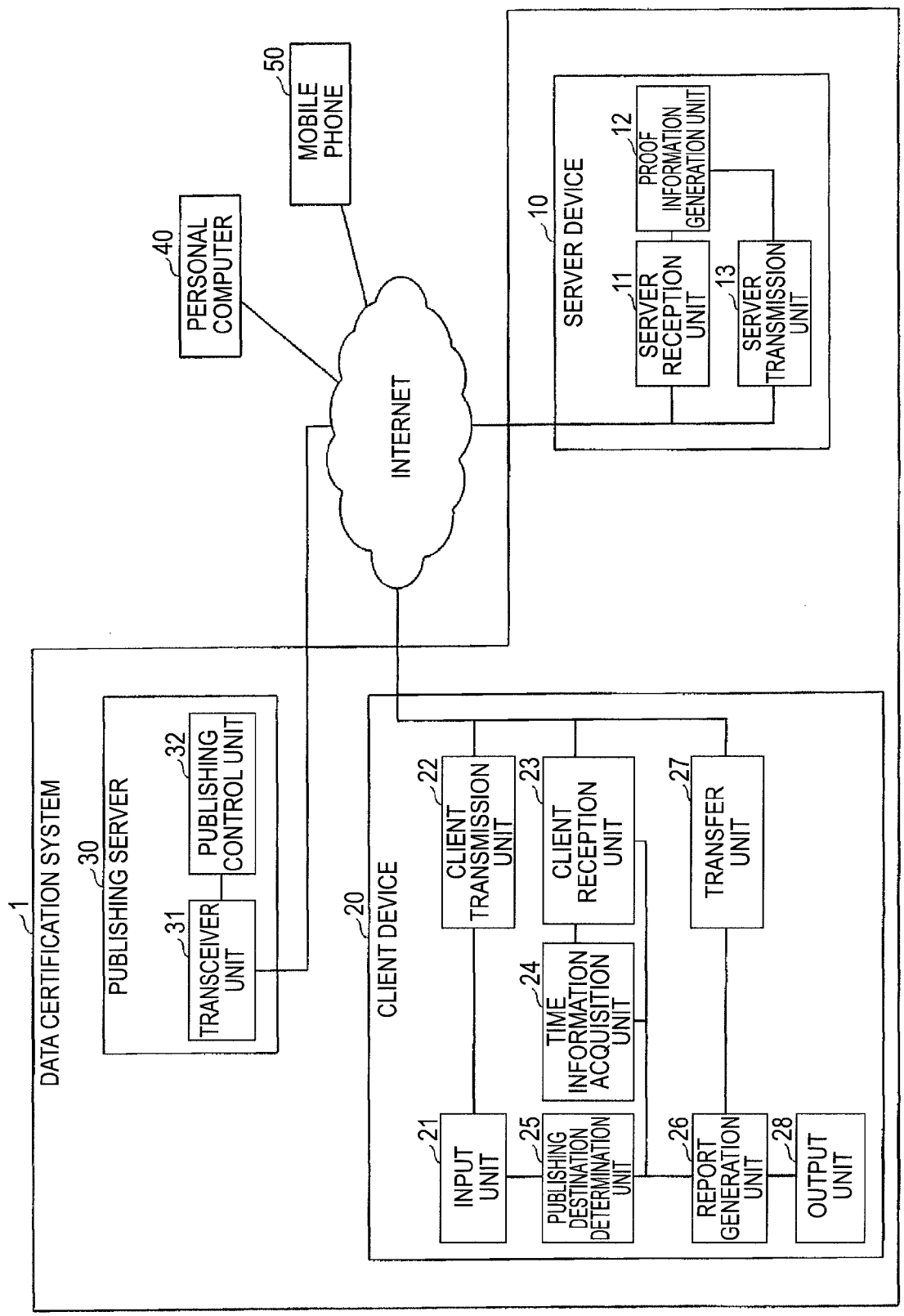
FIG. 1 is a block diagram showing the configuration of a data certification system according to an embodiment of the invention.

Hereinafter, an embodiment of the invention will be described referring to the drawings. FIG. 1 is a block diagram showing the configuration of a data certification system according to this embodiment. In the example shown in the drawing, a data certification system 1 includes a server device 10, a client device 20, and a publishing server 30. The server device 10 generates proof information for certifying non-falsification of raw data (hereinafter, referred to as raw data) of a report with a test result described therein. The client device 20 is a device which creates report data as raw data, in which a part or the entire part of the proof information and publishing destination information representing a publishing destination are included in the raw data. The publishing server 30 is a device which releases the raw data, the proof information, and the report data on the World Wide Web (WWW) to be uniquely identified by the publishing destination information. A personal computer 40 or a mobile phone 50 can be communication-connected to the publishing server 30 through the Internet.

The server device 10 includes a server reception unit 11, a proof information generation unit 12, and a server transmission unit 13. The server reception unit 11 receives raw data transmitted from the client device 20. The proof information generation unit 12 generates proof information including certification information for certifying non-falsification of the raw data and time information representing the time of the generation of the certification information on the basis of the raw data received by the server reception unit 11. It should suffice that the proof information is information which can verify non-falsification of raw data, and for example, an electronic signature (certification information) and a time stamp (time information) are used as the proof information. With the use of the electronic signature and the time stamp, a long-term signature can be used as the proof information. The server transmission unit 13 transmits the proof information generated by the proof information generation unit 12 to the client device 20.

The client device 20 includes an input unit 21, a client transmission unit 22, a client reception unit 23, a time information acquisition unit 24, a publishing destination determination unit 25, a report generation unit 26, a transfer unit 27, and an output unit 28. The input unit 21 receives raw data subject to certification of non-falsification as input. The client transmission unit 22 transmits the raw data input through the input unit 21 to the server device 10. The client reception unit 23 receives the proof information transmitted from the server device 10. The time information acquisition unit 24 extracts the time stamp from the proof information received by the client reception unit 23 and acquires the time of the generation of the certification information.

The publishing destination determination unit 25 determines publishing destination information representing the publishing destination of report data (raw data, proof information, and report data) with the raw data and the proof information. As a method of determining publishing destination information, any method may be used if publishing destination information which can uniquely identify the publishing destination of each combination of raw data, proof information, and report data can be determined. For example, as a method of determining publishing destination information, a method is used, in which a hash value of raw data is calculated and a URI with the address of the publishing server 30, the hash value of the raw data, and the file name of the report data combined therein is determined as the publishing destination information. Specifically, when the address of the publishing server is [http://www.server/], the hash value of the raw data is [68ff356589064a31e34724cd13796950e3b0530f], and the file name of the report data is [20110722001.xxx], the publishing destination determination unit 25 determines the publishing destination information as [http://www/server/68ff356589064a31e34724cd13796950e3b0530f/20110722001.xxx]. When the URL determined by the publishing destination determination unit 25 is long, a reduced URL may be used as the publishing destination information using a URL reduction service.

The report generation unit 26 generates report data in which the time information acquired by the time information acquisition unit 24 and the publishing destination information determined by the publishing destination determination unit 25 are included in the raw data. The report generation unit 26 may convert the publishing destination information to a two-dimensional code and may generate report data in which the two-dimensional code is included in the raw data such that a user (verifier) who confirms the report can easily access the publishing destination using a mobile phone or the like.

The transfer unit 27 attaches the raw data and the proof information to the report data generated by the report generation unit 26 and transfers the report data with the raw data and the proof information to the publishing server uniquely identified by the publishing destination information. The transfer unit 27 may transfer the raw data, the proof information, and the report data as a set of data to the publishing server uniquely identified by the publishing destination information without attaching the raw data and the proof information to the report data. The output unit 28 outputs the report data generated by the report generation unit 26 such that the verifier can visually recognize the report data. As a method in which the output unit 28 outputs the report data, a method in which the report data is printed and output to a sheet, or a method in which the report data is output in a format to be displayed on a display device including a liquid crystal display or the like may be used.

The publishing server 30 includes a transceiver unit 31 and a publishing control unit 32. The transceiver unit 31 receives the report data (raw data, proof information, and report data) with the raw data and the proof information transferred from the client device 20. The publishing control unit 32 releases the raw data, the proof information, and the report data received by the transceiver unit 31 to the publishing destination uniquely identified by the publishing destination information. When a device (first device, for example, a mobile phone) which cannot verify non-falsification of the report data using the raw data and the proof information is communication-connected to the publishing destination of the raw data, the proof information, and the report data, the publishing control unit 32 transmits only report data among the raw data, the proof information, and the report data released to the publishing destination to the device (mobile phone) through the transceiver unit 31. When a device (second device, for example, a personal computer) which can verify non-falsification of the report data using the raw data and the proof information is communication-connected to the publishing destination of the raw data, the proof information, and the report data, the publishing control unit 32 transmits the raw data, the proof information, and the report data released to the publishing destination to the device (personal computer) through the transceiver unit 31.

In the example shown in FIG. 1, although the client device 20 includes the publishing destination determination unit 25, the invention is not limited thereto, and the server device 10 or the publishing server 30 may include the publishing destination determination unit 25. Even when the server device 10 or the publishing server 30 includes the publishing destination determination unit 25, as the method of determining publishing destination information, as described above, any method may be used if publishing destination information which can uniquely identify the publishing destination of each combination of raw data, proof information, and report data can be determined. When a device other than the client device 20 includes the publishing destination determination unit 25, the publishing destination determination unit 25 determines publishing destination information and then transmits the determined publishing destination information to the client device 20.

The transfer unit 27 of the client device 20 may set an expiration date of the proof information to be transferred to the publishing server 30, and the publishing control unit 32 of the publishing server 30 may transmit the report data to the mobile phone communication-connected to the publishing destination only within the expiration date of the proof information and may transmit the raw data, the proof information, and the report data to the personal computer communication-connected to the publishing destination only within the expiration date of the proof information. Accordingly, when the expiration date of the proof information has elapsed, the publishing control unit 32 of the publishing server 30 can prevent the transmission of the report data to the mobile phone, and can prevent the transmission of the raw data, the proof information, and the report data to the personal computer.

In the example of the data certification system 1 shown in FIG. 1, although the server device 10 and the client device 20 are separate devices, the invention is not limited thereto, and the server device 10 and the client device 20 may be a single device. For example, the client device 20 may include the proof information generation unit 12, and in the client device 20, the proof information including the certification information for certifying non-falsification of the raw data and the time information representing the time of the generation of the certification information may be generated.

Next, raw data of a report with a test result described therein will be described. In this embodiment, raw data of a report includes data of two sheets of papers of "report on result of radioactivity measurement" and "sampling test result". The "report on result of radioactivity measurement" and "sampling test result" are the titles of the papers. FIG. 2 is a schematic view showing an example of "report on result of radioactivity measurement" included in raw data according to this embodiment. In the example shown in the drawing, "report on result of radioactivity measurement" included in raw data includes reference number 201, date 202, title 203, company name 204, report contents 205, and note 206.

The reference number 201 represents a number which uniquely identifies raw data. In the example shown in the drawing, "reference number 12345678" is described in the reference number 201. Date 202 represents date and time on which raw data is created. In the example shown in the drawing, "date YY ZZ, XXXX" is described in the date 202. The title 203 represents the title of paper. In the example shown in the drawing, "report on result of radioactivity measurement" is described in the title 203. The company name 204 represents the name of a company which creates raw data. In the example shown in the drawing, "XX Corporation" is described in the company name 204. The report contents 205 represent a test condition and a test result. In the example shown in the drawing, "1. name of client Mr(s). YY", "2. test object vegetables (tomato) about 500 g", "3. sampling region ZZ city", "4. sampling date YY ZZ, XXXX", "5. test date YY ZZ, XXXX", and "6. overview of test result for crops subjected to test, content of radioactive material is less than a provisional reference value. Details are as stated in attached sheets." are described in the report content 205. The note 206 represents points to note for raw data. In the example shown in the drawing, "points to note . . . " are described in the note 206.

Figure 3:
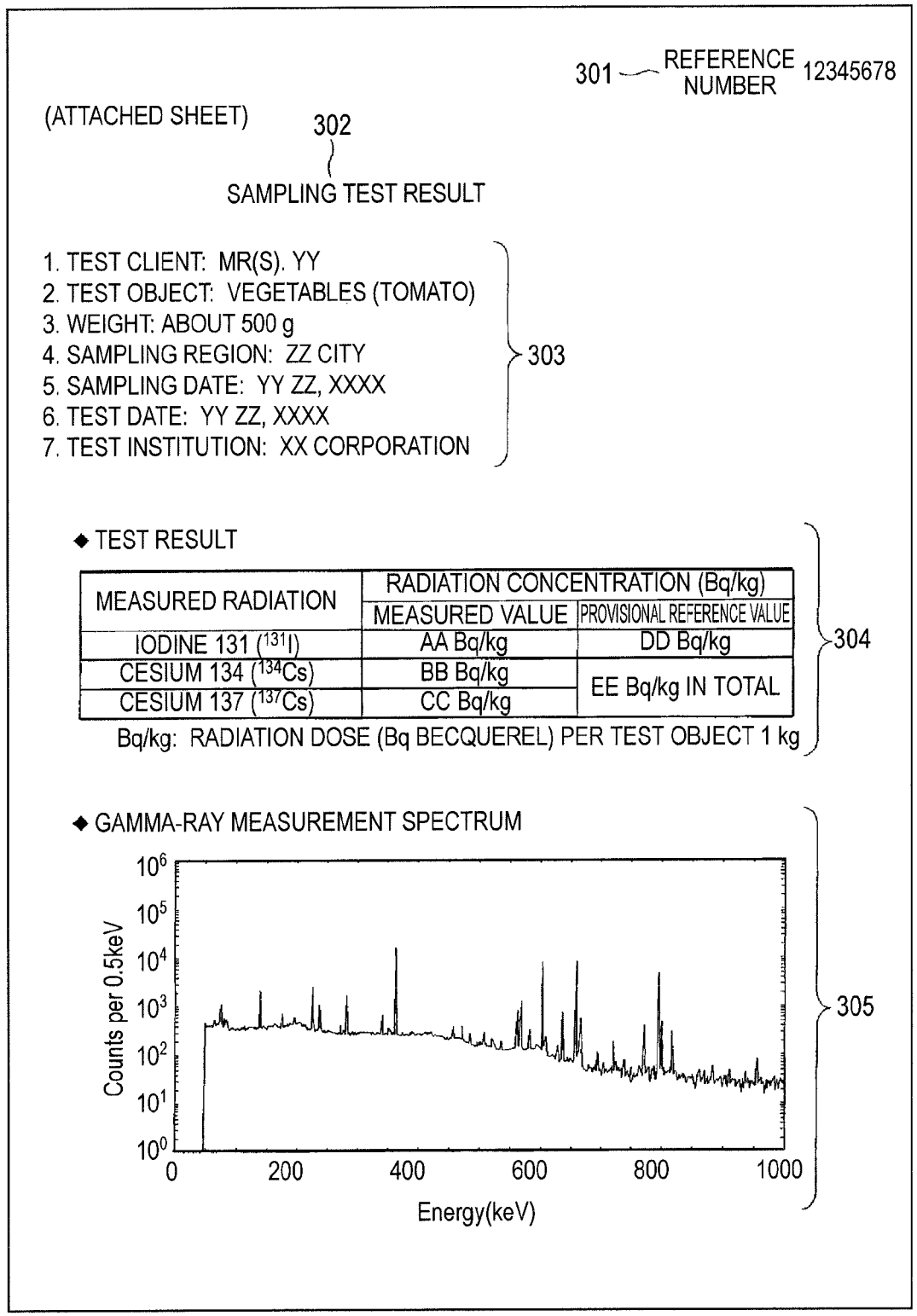
FIG. 3 is a schematic view showing an example of a sampling test result included in raw data according to the present embodiment.

FIG. 3 is a schematic view showing an example of "sampling test result" included in raw data according to this embodiment. In the example shown in the drawing, "sampling test result" included in raw data includes reference number 301, title 302, test condition 303, test result 304, and gamma-ray measurement spectrum 305.

The reference number 301 represents a number which uniquely identifies raw data. In the example shown in the drawing, "reference number 12345678" is described in the reference number 301. The title 302 represents the title of paper. In the example shown in the drawing, "sampling test result" is described in the title 302. The test condition 303 represents a test condition. In the example shown in the drawing, "1. test client: Mr(s). YY", "2. test object: vegetables (tomato)", "3. weight: about 500 g", "4. sampling region: ZZ city", "5. sampling date: YY ZZ, XXXX", "6. test date: YY ZZ, XXXX", and "7. test institution: XX Corporation" are described in the test condition 303.

The test result 304 represents the result of a test for a radiation dose of a test object. In the example shown in the drawing, the test result is described in the form of a table, in which the measured value of iodine 131 ($^{131}$I) is AA Bq/kg, the measured value of cesium 134 ($^{134}$Cs) is BB Bq/kg, the measured value of cesium 137 ($^{137}$Cs) is CC Bq/kg, the provisional reference value of iodine 131 ($^{131}$I) is DD Bq/kg, and the provisional reference value of cesium 134 ($^{134}$Cs) and cesium 137 ($^{137}$Cs) is EE Bq/kg in total. The gamma-ray measurement spectrum 305 represents the result of measurement for a gamma-ray measurement spectrum of a test object. In the example shown in the drawing, the result of measurement for the gamma-ray measurement spectrum of the test object is represented in the form of a graph, and the number of counts (Counts per 0.5 keV) at each energy level (keV) is represented.

Next, the report data in which the time information acquired by the time information acquisition unit 24 and the publishing destination information determined by the publishing destination determination unit 25 are included in "report on result of radioactivity measurement" included in the raw data will be described. In this embodiment, since the raw data of the report include data of two sheets of papers of "report on result of radioactivity measurement" and "sampling test result", the report data also includes two sheets of papers of "report on result of radioactivity measurement" and "sampling test result". In this embodiment, since the time information and the publishing destination information are included in "report on result of radioactivity measurement" of the two sheets of papers of "report on result of radioactivity measurement" and "sampling test result", "sampling test result" included in the report data is the same as "sampling test result" included in the raw data.

FIG. 4 is a schematic view showing an example of "report on result of radioactivity measurement" included in report data according to this embodiment. In the example shown in the drawing, "report on result of radioactivity measurement" included in the report data includes reference number 201, date 202, title 203, company name 204, report contents 205, note 206, time information 207, publishing destination information 208, and description of long-term signature 209. The reference number 201, the date 202, the title 203, the company name 204, the report contents 205, and the note 206 are the same as the respective items of "report on result of radioactivity measurement" included in the raw data.

The time information 207 represents the time of the generation of the certification information included in the proof information. In the example shown in the drawing, "time stamp time (Japan) XXXX/YY/ZZ AA:BB:CC" is described in the time information 207. The publishing destination information 208 represents a publishing destination of raw data, proof information, and report data. In the example shown in the drawing, a two-dimensional code is described in the publishing destination information 208. The description of long-term signature 209 represents that a long-term signature is given to report data and a method of downloading report data.

As described above, the report generation unit 26 generates report data in which time information and publishing destination information are included in "report on result of radioactivity measurement" included in raw data. In the example shown in the drawing, the report generation unit 26 converts the publishing destination information 208 to a two-dimensional code, and generates report data in which the publishing destination information 208 converted to the two-dimensional code is included below the report contents 205 of "report on result of radioactivity measurement" included in the raw data and the time information 207 is included below the publishing destination information 208. Accordingly, since the two-dimensional code is included in the report data, the verifier reads the two-dimensional code with the mobile phone, thereby easily downloading the report data from the publishing server. The positions of the time information 207, the publishing destination information 208, and the description of long-term signature 209 included in the report data may be determined in advance or may be arbitrarily set.

Figure 5:
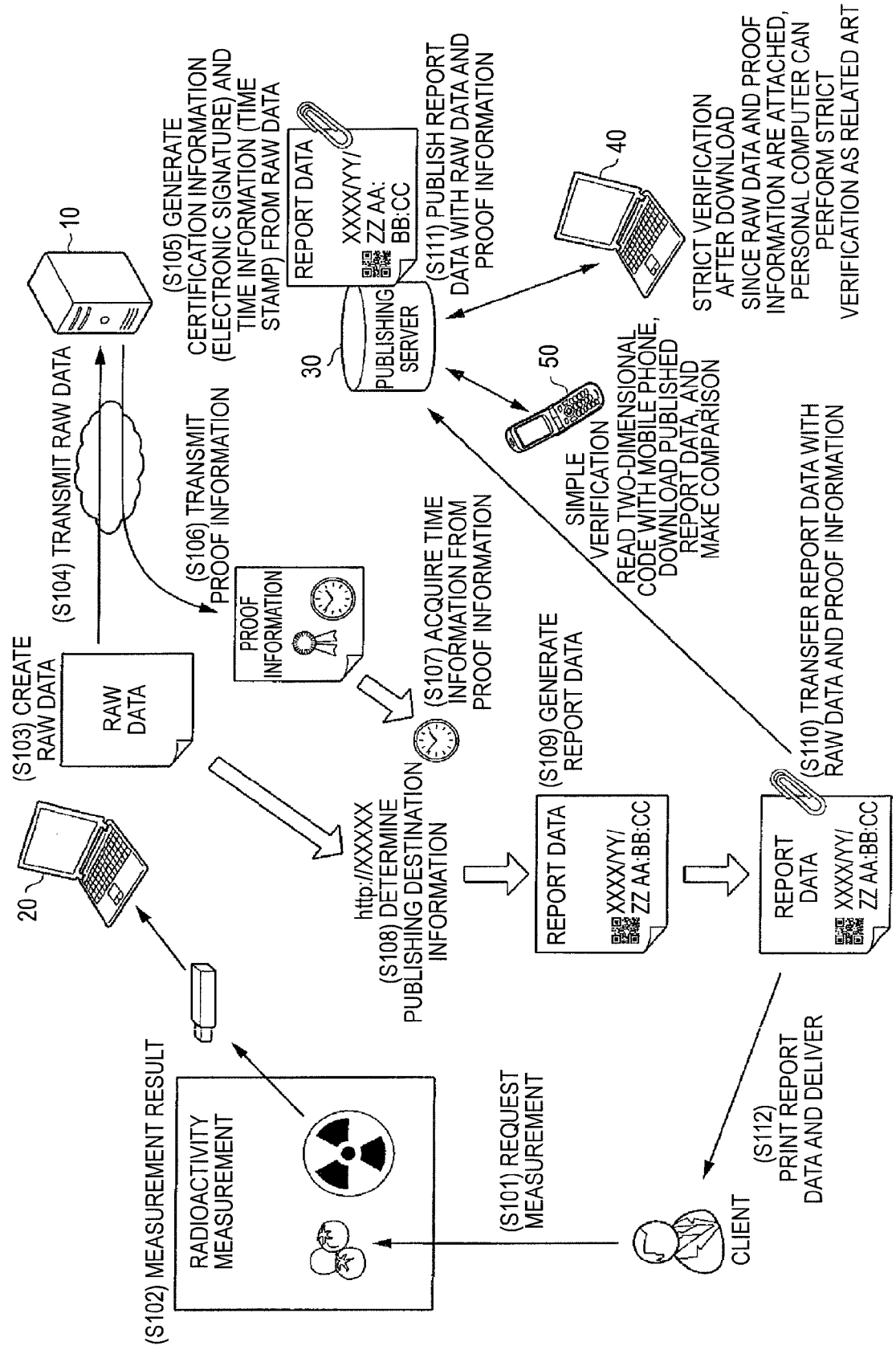
FIG. 5 is a schematic view showing a procedure when report data is created using the data certification system according to the present embodiment.

Next, a report creation procedure for creating a report using the data certification system will be described referring to FIG. 5. FIG. 5 is a schematic view showing a procedure when report data is created using the data certification system according to this embodiment. In the example shown in the drawing, an example where report data representing the result of measurement for radioactivity of a test object is generated is described.

First, a client requests a measurer to perform measurement for radioactivity of a test object (Step S101). The measurer measures radioactivity of the test object to acquire the measurement result (Step S102). Thereafter, the measurer creates raw data of a report with the measurement result described therein using the client device 20 (Step S103). The measurer may generate raw data of the report using a device different from the client device 20 and may input the generated raw data to the client device 20.

Subsequently, the measurer causes the client device 20 to transmit the raw data to the server device 10 (Step S104). The server device 10 receives the raw data transmitted from the client device 20, and generates proof information including certification information (electronic signature) for certifying non-falsification of the received raw data and time information (time stamp) representing the time of the generation of the certification information (Step S105). Subsequently, the server device 10 transmits the generated proof information to the client device 20 (Step S106).

The client device 20 receives the proof information transmitted from the server device 10 and acquires the time information from the received proof information (Step S107). The client device 20 calculates a hash value based on the raw data and determines publishing destination information for uniquely identifying a destination to release the report on the basis of the calculated hash value (Step S108). Subsequently, the client device 20 generates report data in which the publishing destination information and the time information are included in the raw data (Step S109). Thereafter, the client device 20 attaches the raw data and the proof information to the generated report data and transfers the report data to the publishing server 30 uniquely identified by the publishing destination information (Step S110). The publishing server 30 releases the transferred report data, raw data, and proof information to the publishing destination uniquely identified by the publishing destination information (Step S111). The client device 20 prints and outputs the generated report data to paper. Thereafter, the measurer delivers the output report data to the client (Step S112).

With the above-described procedure, the data certification system 1 can generate report data. Next, a method of verifying report data generated by the data certification system will be described. Hereinafter, a method of verifying report data using a personal computer as a device, which can verify non-falsification of report data using raw data and proof information, and a method of verifying report data using a mobile phone as a device, which cannot verify non-falsification of report data using raw data and proof information will be described.

(Method of Verifying Report Data Using Personal Computer)

The verifier operates the personal computer 40 to perform communication connection to the publishing destination to release report data. When the personal computer 40 is communication-connected to the publishing destination, the publishing server 30 transmits the report data, the raw data, and the proof information released to the publishing destination to the personal computer 40. The personal computer 40 receives the report data, the raw data, and the proof information transmitted from the publishing server 30. The personal computer 40 verifies whether or not the report data has been falsified using the received raw data and proof information. As a verification method, for example, a verification method using an electronic signature or a time stamp which is known in the related art is considered. Accordingly, the verifier can strictly perform the verification on whether or not the report data released to the publishing server 30 has been falsified using the personal computer 40 as in the related art. The verifier causes the report data received by the personal computer 40 to be displayed on the display of the personal computer 40, and compares the report displayed on the display with the report output from the output unit of the client device 20, thereby verifying whether the report output from the output unit 28 of the client device 20 has been falsified.

(Method of Verifying Report Data Using Mobile Phone)

The verifier reads two-dimensional code displayed (printed) on the report output from the output unit 28 of the client device 20 using the mobile phone 50. The mobile phone 50 analyzes the two-dimensional code to acquire the publishing destination information and performs communication connection to the destination uniquely identified by the publishing destination information. When the mobile phone 50 is communication-connected to the publishing destination, the publishing server 30 transmits the report data released to the publishing destination to the mobile phone 50. The mobile phone 50 receives the report data transmitted from the publishing server 30 and displays the report based on the report data. With the verification of the report data using the personal computer 40, since it is certified that the report data released to the publishing server 30 is data which is not falsified, the verifier compares the report output from the output unit 28 of the client device 20 with the report displayed on the display unit of the mobile phone 50, and verifies whether or not the report output from the output unit 28 of the client device 20 has been falsified. Specifically, when the verifier compares the report output from the output unit 28 of the client device 20 with the report displayed on the display unit of the mobile phone 50 and confirms that both reports match each other, it is possible to verify that the report output from the output unit 28 of the client device 20 is not falsified. When the report displayed on the display unit of the mobile phone 50 is different from the report output from the output unit 28 of the client device 20, it is possible to verify that the report output from the output unit 28 of the client device 20 has been falsified.

Next, a procedure when report data is created using the data certification system 1 and the verifier verifies non-falsification of report data using the mobile phone 50 will be described referring to FIG. 6. FIG. 6 is a sequence diagram showing an operational procedure when a report is created using the data certification system 1 according to this embodiment and the verifier verifies non-falsification of report data using the mobile phone 50. In the example shown in the drawing, the client device 20 already receives the proof information from the server device 10.

(Step S201) The publishing destination determination unit 25 of the client device 20 calculates a hash value based on raw data and determines publishing destination information for uniquely identifying the destination to release report data on the basis of the calculated hash value. Thereafter, the process progresses to Step S202.

(Step S202) The report generation unit 26 of the client device 20 converts the publishing destination information determined by the publishing destination determination unit 25 in Step S201 to a two-dimensional code. Subsequently, the report generation unit 26 generates report data in which the time information and the publishing destination information converted to the two-dimensional code is included in the raw data. Thereafter, the process progresses to Step S203.

(Step S203) The transfer unit 27 of the client device 20 attaches the raw data and the proof information to the report data generated by the report generation unit 26 in Step S202, and transfers the report data with the raw data and the proof information to the publishing server 30 uniquely identified by the publishing destination information determined by the publishing destination determination unit 25 in Step S201. The output unit 28 of the client device 20 prints and outputs the report data generated by the report generation unit 26 in Step S202 to paper. Thereafter, the process progresses to Step S204.

(Step S204) The transceiver unit 31 of the publishing server 30 receives the report data with the raw data and the proof information transferred from the client device 20 in Step S203. Subsequently, the publishing control unit 32 of the publishing server 30 releases the report data with the raw data and the proof information received by the transceiver unit 31 to the publishing destination uniquely identified by the publishing destination information. Thereafter, the process progresses to Step S205.

(Step S205) The verifier reads the two-dimensional code printed on the report using the mobile phone 50. The mobile phone 50 analyzes the two-dimensional code to acquire the publishing destination information and performs communication connection to the destination uniquely identified by the publishing destination information. Thereafter, the process progresses to Step S206.

(Step S206) When the mobile phone 50 is communication-connected to the publishing destination, the publishing server 30 transmits the report data released to the publishing destination to the mobile phone 50.

(Step S207) The mobile phone 50 receives the report data transmitted from the publishing server 30 and displays the report based on the received report data on the display unit. The verifier compares the printed report with the report displayed on the display unit of the mobile phone 50 and verifies whether or not the printed report has been falsified.

As described above, according to this embodiment, the client transmission unit 22 of the client device 20 transmits raw data subject to certification of non-falsification to the server device 10. The server reception unit 11 of the server device 10 receives the raw data transmitted from the client device 20. The proof information generation unit 12 of the server device 10 generates certification information for certifying non-falsification of the raw data on the basis of the raw data received by the server reception unit 11, and generates proof information including the certification information and time information representing the time of the generation of the certification information. The server transmission unit 13 of the server device 10 transmits the proof information to the client device 20.

The client reception unit 23 of the client device 20 receives the proof information transmitted from the server device 10. The time information acquisition unit 24 of the client device 20 acquires the time information representing the time of the generation of the certification information included in the proof information from the proof information received by the client reception unit 23. The report generation unit 26 of the client device 20 generates report data in which the time information and publishing destination information representing a publishing destination are included in the raw data. The publishing destination information may be determined by the server device 10, may be determined by the publishing destination determination unit 25 of the client device 20, or may be arbitrarily set.

The transfer unit 27 of the client device 20 transfers the raw data, the proof information, and the report data to the publishing server 30 which releases the raw data, the proof information, and the report data to the publishing destination uniquely identified by the publishing destination information. The output unit 28 of the client device 20 outputs the report data generated by the report generation unit 26. As a method in which the output unit 28 of the client device 20 outputs the report data, the report data may be printed and output to paper, or the report data may be output in a data format to be displayed on a display device including a liquid crystal display or the like.

The transceiver unit 31 of the publishing server 30 receives the raw data, the proof information, and the report data transferred from the client device 20. The publishing control unit 32 of the publishing server 30 releases the raw data, the proof information, and the report data received by the transceiver unit 31 to the publishing destination uniquely identified by the publishing destination information. When a device (for example, a mobile phone or the like) which cannot verify non-falsification of the report data using the raw data and the proof information is communication-connected to the publishing destination of the raw data, the proof information, and the report data, the publishing control unit 32 transmits only the report data among the raw data, the proof information, and the report data released to the publishing destination to the device through the transceiver unit 31. When a device (for example, a personal computer) which can verify non-falsification of the report data using the raw data and the proof information is communication-connected to the publishing destination of the raw data, the proof information, and the report data, the publishing control unit 32 transmits the raw data, the proof information, and the report data released to the publishing destination to the device through the transceiver unit 31.

In this way, since the report data of non-falsification is released to the publishing server 30, in the related art, even when a device, such as the mobile phone 50, which cannot verify non-falsification of the report data using the raw data and the proof information is used, the report data is downloaded from the publishing server 30 and displayed, thereby verifying whether or not the report data output from the output unit 28 of the client device 20 has been falsified. Specifically, the verifier just compares the report data displayed on the mobile phone 50 with the report data (for example, report data printed on paper or report data displayed on the display device) output from the output unit 28 of the client device 20, thereby verifying whether or not the report data output from the output unit 28 has been falsified. Accordingly, it is possible to verify whether or not the report data output from the output unit 28 has been falsified without using the server device 10 which issues the proof information as information for certifying non-falsification.

The raw data and the proof information are released to the publishing server along with the report data. For this reason, as in the related art, it is possible to perform strict verification of non-falsification using a device, such as the personal computer 40, which can verify non-falsification of the report data using the raw data and the proof information. Therefore, since a third party can verify non-falsification of the report data released to the publishing server, thereby inhibiting falsification of the report data released to the publishing server.

All or a part of the functions of the respective units of the server device 10, the client device 20, and the publishing server 30 in the above-described embodiment may be realized by recording a program for realizing these functions in a computer-readable recording medium, and reading and executing the program recorded in the recording medium on a computer system. It is assumed that the term "computer system" includes an OS or hardware, such as peripherals.

The term "computer-readable recording medium" refers to a portable medium, such as a flexible disk, a magneto-optical disk, a ROM, or a CD-ROM, or a storage unit, such as a hard disk embedded in the computer system. The term "computer-readable recording medium" may include a medium, such as a communication wire when a program transmits through a network, such as Internet, or a communication line, such as a telephone line, which dynamically retains a program for a short time, or a medium, such as a volatile memory in the computer system serving as a server or a client in this case, which temporarily retains a program for a given time. The above-described program may realize a part of the above-described functions, or may realize the above-described functions in combination with a program already recorded in the computer system.

The invention is not limited to the foregoing embodiment, and various changes may be made within the scope without departing from the spirit of the invention. For example, in the foregoing embodiment, although description has been provided using the radioactivity measurement result as raw data, the invention is not limited thereto, and any type of data may be used.

REFERENCE SIGNS LIST

1: data certification system, 10: server device, 11: server reception unit, 12: proof information generation unit, 13: server transmission unit, 20: client device, 21: input unit, 22: client transmission unit, 23: client reception unit, 24: time information acquisition unit, 25: publishing destination determination unit, 26: report generation unit, 27: transfer unit, 28: output unit, 30: publishing server, 31: transceiver unit, 32: publishing control unit

The invention claimed is:
1. A data certification system comprising:
a server device, a client device and a publishing server in communication with one another,
wherein the server device comprises:
a server reception unit which receives raw data subject to certification of non-falsification transmitted from a client device,
a proof information generation unit which generates certification information for certifying non-falsification of the raw data on the basis of the raw data received by the server reception unit, and generates proof information including the certification information and time information representing the time of the generation of the certification information, and
a server transmission unit which transmits the proof information to the client device;
wherein the client device comprises:
a client transmission unit which transmits the raw data to the server device,
a client reception unit which receives the proof information transmitted from the server device,
a time information acquisition unit which acquires the time information representing the time of the generation of the certification information included in the proof information from the proof information received by the client reception unit,
a report generation unit which generates report data including the time information and publishing destination information representing a publishing destination in the raw data,
a transfer unit which transfers the raw data, the proof information, and the report data to the publishing server which releases the raw data, the proof information, and the report data to the publishing destination uniquely identified by the publishing destination information, and
an output unit which outputs the report data generated by the report generation unit, and
wherein the publishing server transmits only the report data to a first device that is in communication with the publishing destination and that cannot verify non- falsification of the report data using the raw data and the proof information, and wherein the publishing server transmits the report data, the raw data, and the proof information to a second device which is in communication with the publishing destination and which can verify non-falsification of the report data using the raw data and the proof information.

2. The data certification system according to claim 1, wherein the transfer unit sets an expiration date of the proof information; and wherein the publishing server transmits the report data to the first device only when the first device is in communication with the publishing destination within the expiration date of the proof information, and transmits the report data, the raw data, and the proof information to the second device only when the second device is in communication with the publishing destination within the expiration date of the proof information.

3. The data certification system according to claim 1, wherein the report generation unit converts the publishing destination information to a two-dimensional code and includes the two-dimensional code in the report data.

4. The data certification system according to claim 1, wherein the output unit prints and outputs the report data to paper.

5. The data certification system according to claim 1, wherein the output unit outputs the report data in a data format configured to be displayed on a display device.

6. The data certification system according to claim 1, wherein the client device further includes a publishing destination determination unit which calculates a hash value based on the raw data and determines the publishing destination on the basis of the calculated hash value.

7. The data certification system according to claim 1, wherein the server device further includes a publishing destination determination unit which calculates a hash value based on the raw data and determines the publishing destination on the basis of the calculated hash value; and wherein the server transmission unit transmits the proof information and the publishing destination information representing the publishing destination to the client device.

8. A publishing server comprising:
a transceiver unit for receiving raw data subject to certification of non-falsification transferred from a client device, proof information including certification information for certifying non-falsification of the raw data and time information representing the time of the generation of the certification information, and report data in which the time information and publishing destination information representing a uniquely identified publishing destination are included in the raw data; and a publishing control unit for releasing the raw data, the proof information, and the report data to the uniquely identified publishing destination, transmitting only the report data to a first device which is in communication with the publishing destination and which cannot verify non-falsification of the report data using the raw data and the proof information, and transmitting the report data, the raw data, and the proof information to a second device which is in communication with the publishing destination and which can verify non-falsification of the report data using the raw data and the proof information.

9. The publishing server according to claim 8, wherein the publishing control unit transmits the report data to the first device only when the first device is in communication with the publishing destination within an expiration date of the proof information, and transmits the report data, the raw data, and the proof information to the second device only when the second device is in communication with the publishing destination within the expiration date of the proof information.

* * * * *